United States Patent
Moreland (10) Patent No.: US 9,285,496 B1
(45) Date of Patent: Mar. 15, 2016

(54) TRUNCATED HALF-SINE METHODS FOR METAL DETECTORS

(71) Applicant: White's Electronics, Inc., Sweet Home, OR (US)

(72) Inventor: Carl Moreland, Corvallis, OR (US)

(73) Assignee: White's Electronics, Inc., Sweet Home, OR (US)

( * ) Notice: Subject to any disclaimer, the term of this patent is extended or adjusted under 35 U.S.C. 154(b) by 132 days.

(21) Appl. No.: 14/060,200

(22) Filed: Oct. 22, 2013

Related U.S. Application Data (60) Provisional application No. 61/716,677, filed on Oct. 22, 2012.

(51) Int. Cl.
*G01V 3/10* (2006.01)
(52) U.S. Cl.
CPC ..................... *G01V 3/104* (2013.01)
(58) Field of Classification Search
CPC ............. G01V 3/00; G01V 3/08; G01V 3/10; G01V 3/15; G01V 3/104
USPC .................... 324/326–345, 67, 239
See application file for complete search history.

(56) References Cited

U.S. PATENT DOCUMENTS

| | | | |
|---|---|---|---|
| 5,414,411 A | 5/1995 | Lahr | |
| 5,537,041 A | 7/1996 | Candy | |
| 5,576,624 A | 11/1996 | Candy | |
| 6,653,838 B2 | 11/2003 | Candy | |
| 8,629,677 B2 | 1/2014 | Earle | |
| 2004/0119475 A1* | 6/2004 | Earle | 324/329 |
| 2009/0318098 A1* | 12/2009 | Stamatescu et al. | 455/118 |
| 2011/0316541 A1* | 12/2011 | Earle | 324/326 |

* cited by examiner

*Primary Examiner* — Son Le
(74) *Attorney, Agent, or Firm* — James Creighton Wray

(57) ABSTRACT

This invention relates to a metal detector where a coil is used to transmit a periodic magnetic field to energize metal objects that are concealed and often buried or hidden in a matrix (ground) containing ferromagnetic minerals. There are many difficult and often simultaneous challenges, such as detecting large deep targets, detecting minutely small targets, identifying target properties, ignoring the ferromagnetic matrix, avoiding a net magnetic field which can trigger magnetic sensors in land mines, and ignoring conductive salt responses. Either time-domain or frequency domain methods have been used to address these challenges with mixed levels of success. The ability to simultaneously use time-domain and frequency-domain methods can expand detection capability. Techniques are presented for achieving these goals.

31 Claims, 7 Drawing Sheets

TRUNCATED HALF-SINE METHODS FOR METAL DETECTORS

This application claims the benefit of U.S. Provisional Application No. 61/716,677 filed Oct. 22, 2012, which is hereby incorporated by reference in its entirety as if fully set forth herein.

FIELD OF THE INVENTION

This invention relates to metal detectors with means to transmit, receive, and process signals.

BACKGROUND OF THE INVENTION

Induction metal detectors are generally designed to transmit either continuous wave (CW) signals, so-called frequency-domain (FD) detectors or to use pulsed or rectangular signals, so-called time-domain (TD) detectors. For the purpose of this invention description, a transmit waveform is understood to mean coil current unless otherwise noted.

Often both types of designs use substantially similar receiver architectures: a preamp followed by one or more synchronous demodulation channels, integration and/or filtering, analog-to-digital conversion, and digital signal processing. To date, commercialized metal detectors that mix FD and TD in the same design are rare and tend to be user-selected to one mode or the other, but do not run simultaneously.

Time-domain detectors are often referred to as pulse induction (PI) detectors, as most designs create a short pulse of current using a switched coil. When the current is switched off, the result is a high voltage flyback. The decay of the flyback is usually critically damped with a damping resistor, and the decay of the flyback is monitored for perturbations due to nearby metal targets. See U.S. Pat. No. 5,414,411.

Figure 1:
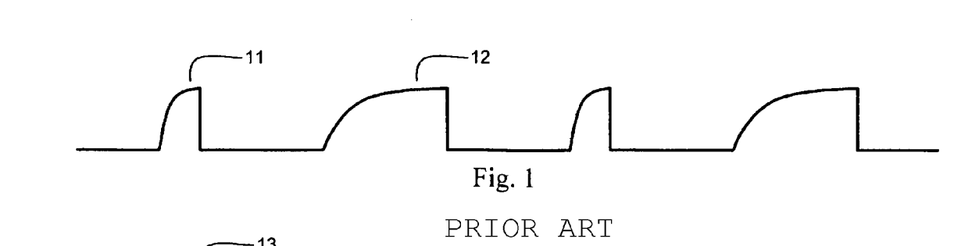
FIG. 1 shows varied pulse width in PI detectors.
Figure 2:
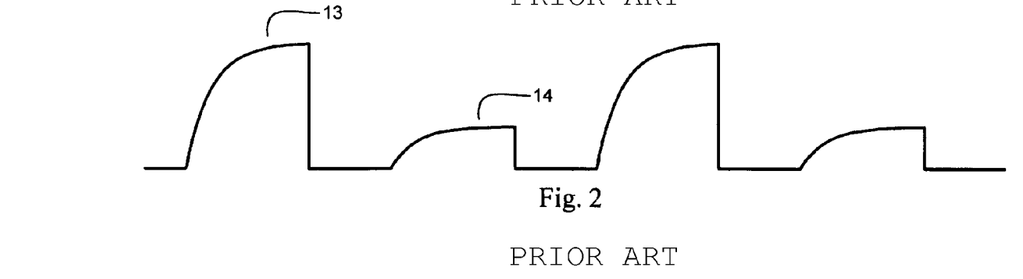
FIG. 2 shows differing peak current amplitudes in PI detectors.

A typical pulse induction metal detector transmits a single pulse width duration of a consistent peak current amplitude, resulting in a single response that must be processed. Some methods have been described which use either multiple pulse width durations (see FIG. 1, U.S. Pat. No. 5,576,624) such as a series of short pulses 11 and long pulses 12. Some methods create differing peak current amplitudes (see FIG. 2 U.S. Pat. No. 6,653,838), such as a series of high current pulses 13 and a low current pulses 14. Either of the methods can produce variable responses to eddy current targets or to ferromagnetic ground or both. Typically such multiple responses are processed through multiple receive channels, whether such channels are realized in hardware, software, or a combination. These methods are analogous to so-called "multifrequency" metal detectors which use frequency-domain techniques.

Figure 3:
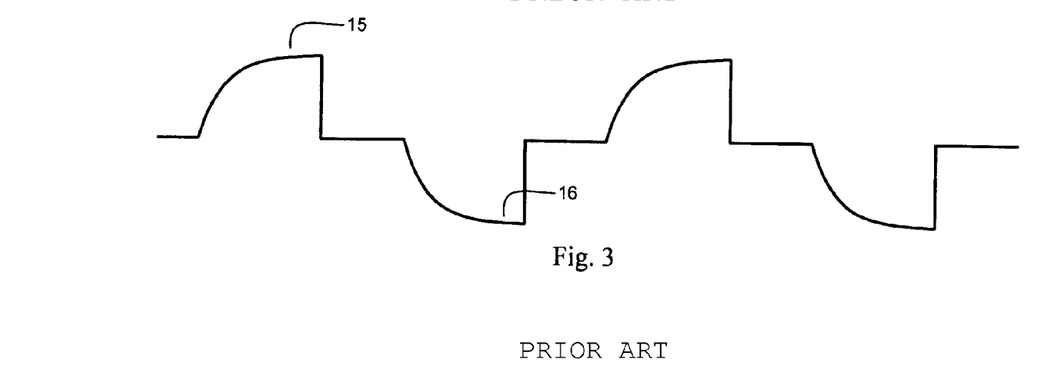
FIG. 3 shows bipolar pulsing in PI detectors.

PI detectors are often used in military and humanitarian demining. Some land mines include a magnetic trigger, so this application requires the use of bipolar pulsing to avoid the creation of a non-zero net magnetic field (see U.S. Pat. No. 6,653,838 and FIG. 3) which shows a series of positive pulses 15 and negative pulses 16. Additional benefits are possible with bipolar pulsing. Subtracting the responses of the two polarities substantially cancels induced signals from the Earth's magnetic field and other low-frequency interferers while maintaining eddy current induced target responses.

In many applications, a desirable feature in a metal detector is the ability to distinguish between various types of targets such as ferrous versus non-ferrous or low conductor versus high conductor. Currently available PI detectors generally exhibit poor discrimination capabilities. Frequency domain designs utilizing CW signals, especially sine waves, often use the target phase response to determine target characteristics. However, PI detectors generally achieve greater detection depths than do CW detectors, especially in ground which is high in mineralization or exhibits high magnetic viscosity. The ability to tune out mineralized ground is generally referred to as Ground Balance (GB). While both PI and CW designs include methods of ground balance, PI is inherently less sensitive to mineralization than CW. However, the GB method in many PI designs involves the subtraction of two signal samples, which not only reduces depth in general. The subtraction can also completely subtract out certain target responses, resulting in so-called "target holes" where particular targets cannot be detected at all.

Needs exist for improved metal detectors.

SUMMARY OF THE INVENTION

This invention covers methods of generating and processing both types of signals in a single metal detector and running both types, CW and PI, simultaneously.

The highly desirable solution combines the advantages of each system: the depth of PI with the discrimination of CW, plus a GB method which does not suffer from loss of depth or target holes.

The invention provides a new and improved metal detector having one or more transmit coils for producing a cyclic transmitted magnetic field in response to a cyclic transmit current. Each transmit current cycle has one or more transmit current pulses that exhibit approximately a half-sine waveform during turn-on, which sinusoidally rises to a peak current, and which at or past the peak current is truncated by substantially shutting off the coil current. The shut off is followed by a turn-off time in which the applied transmit current is substantially zero. A transmit circuitry for generating the transmit current pulses applied to the one or more transmit coils has one or more switching networks for switching the one or more coils to appropriate drive circuitry having a unipolar or bipolar power supply voltage and one or more series-connected resonant capacitors for the purpose of producing a substantially half-sine response during the turn-on time. One or more receive coils receive a response signal created from the transmitted magnetic field and its effect on a surrounding matrix and conductive targets. A receive circuitry has a plurality of receive channels. Each channel has sampling circuitry and processing circuitry.

The transmit current pulse is a truncated half-sine, which is truncated substantially close to the peak of the half-sine current waveform and after the peak of the half-sine current waveform.

A transmit current pulse is followed by a turn-off time in which the applied transmit current is substantially zero, which is followed by a substantially identical transmit current pulse of opposite current polarity. A plurality of transmit current pulses are truncated half-sine current pulses of different pulse width durations with the same characteristic sinusoidal resonance response.

Each pulse width duration is effected by a switching network for switching the one or more coils to drive circuitry that includes a series-connected resonance capacitor having a value selected to produce a truncated half-sine current response in which each pulse width duration has substantially the same truncation current level relative to its peak current level. In one form, the drive circuitry for each pulse width duration is powered by the same power supply voltage. In another embodiment, the drive circuitry for each pulse width duration is powered by a different power supply voltage. The power supply voltage is scaled according to the pulse width duration and resonance capacitor selection such that each pulse width duration has substantially the same current amplitude.

One receive channel samples a received flyback response created by the truncation of the transmit current. The flyback response is called the flyback sample. Another receive channel samples a received half-sine response after the peak of the transmit half-sine current but before the truncation point, which is called the ground sample. The flyback sample and the ground sample are combined, and either or both samples are adjusted such that the combined response due to a ground matrix is substantially minimized. The metal detector has adjustment for one or more of sample delay, sample width, or sample gain. The adjustment is under the manual control of the user, or is under the automated control of the metal detector.

A receive circuit samples a received half-sine response substantially at the peak of the transmit half-sine current which is called the X sample. The X sample is processed to determined characteristics of the ground matrix. The results are used to automatically adjust the ground sample such that the combined response of the flyback sample and the ground sample due to the ground matrix is substantially minimized.

In one embodiment, a receive circuit samples a received half-sine response shortly after the beginning of the transmit half-sine current turn-on point, which is called the R sample. The X sample and the R sample are processed and compared to determined probable target type.

In one embodiment of a metal detector, a receive channel samples a received flyback response created by the truncation of the transmit current which is called the flyback sample. The flyback sample is used to determine the presence of a conductive target, and the R sample is used to determine probable target type. The position of the R sample may be adjusted to change the response of certain target types for the purpose of accepting or rejecting certain target responses. In one embodiment, a plurality of pulse width durations are received and processed. The results are scaled and subtracted to substantially eliminate the response of saltwater.

These and further and other objects and features of the invention are apparent in the disclosure, which includes the above and ongoing written specification, with the claims and the drawings.

DETAILED DESCRIPTION

Figure 4:
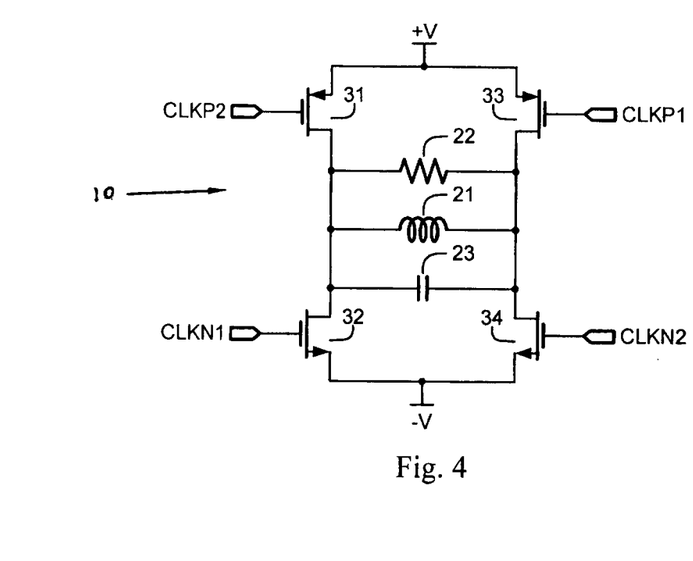
FIG. 4 shows an H-bridge driver in a CW detector.
Figure 5:
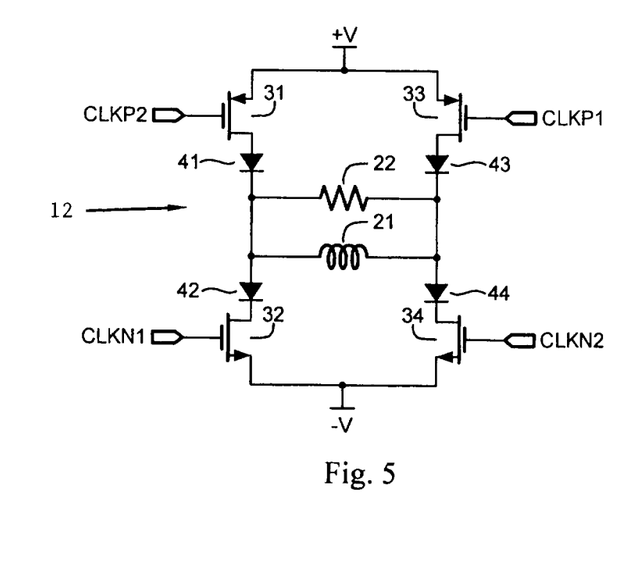
FIG. 5 shows an H-bridge driver in a PI detector.

Bipolar transmit signals can be generated in a number of ways. A straightforward approach is to use an H-bridge driver with coil 21, resistor 22, capacitor 23, and switches 31, 32, 33, 34 which can drive current through a coil in either direction. This method has been used in both CW detectors 10 (FIG. 4) and PI detectors 12 (FIG. 5), the major difference being the addition of flyback diodes 41, 42, 43, 44 in the PI version. In the CW method coil 21 can be resonated with a parallel capacitor 23 to generate a sine wave or left unresonated to generate a ramp waveform. A benefit of the H-bridge driver is that the responses of both current polarities are substantially matched.

Figure 6:
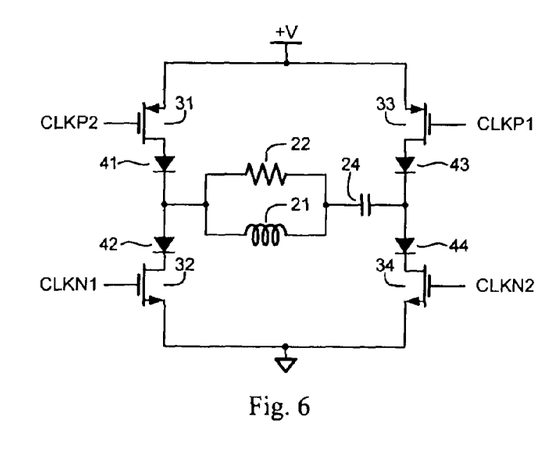
FIG. 6 shows a circuit of the present invention.

By adding a series-resonant capacitor to the PI H-bridge design it is possible to achieve a sinusoidal response during a turn-on duration along with a transient response at the turn-off point. FIG. 6 shows a circuit with a series-resonant capacitor 24 added.

Figure 7:
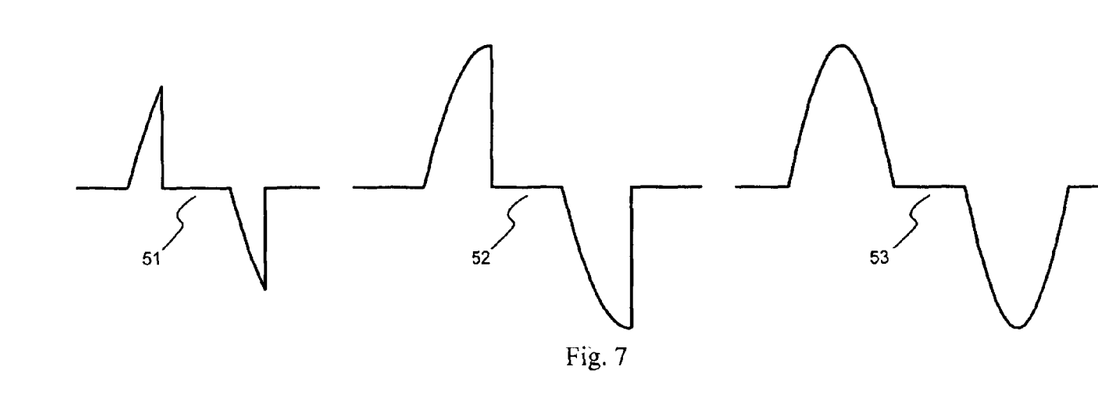
FIG. 7 shows three of many possible responses.

FIG. 7 shows three of many possible responses. The response 51 is similar to what some traditional PI transmit circuits achieve. Response 52 shows a quarter-sine response, whereby the H-bridge is turned off exactly at the peak of the sinusoid current. This has a performance benefit. In PI detectors it is desirable to have the coil charge current plateau to a reasonably constant level (di/dt=0) to allow forward-induced target eddy currents to die out before the coil current is shut off. Any residual forward-induced eddy currents will subtract from the desired reverse-induced eddy currents, reducing the overall target signal just after the coil turn-off event.

The series resonant capacitor substantially speeds up this process compared to the normal exponential response of the coil alone. Response 53 shows a half-sine response, when the H-bridge is turned off exactly at the zero crossing of the sinusoid current.

The frequency of the sinusoidal portion of the transmit signal is found by the traditional LC resonance equation, $$f = \frac{1}{2\pi\sqrt{LC}}$$

where L is the search coil 21 and reactance C is the series resonant capacitor 24 capacitance. Therefore, for a given L-C combination the clock timing can be varied to achieve a transient cutoff at any point during the sinusoid. It is also possible to implement a full sinusoidal (CW) current response. In current metal detector designs there is a trade-off between continuous wave, which offers good target identification through phase analysis, and pulse induction which offers greater depth through an impulse response. A hybrid system is desirable in which both a phase analysis and an impulse response are simultaneously present. This can be effected with the quarter-wave response 53, but it is further advantageous to allow the coil current to proceed somewhat beyond the peak before cutting it off.

Figure 8:
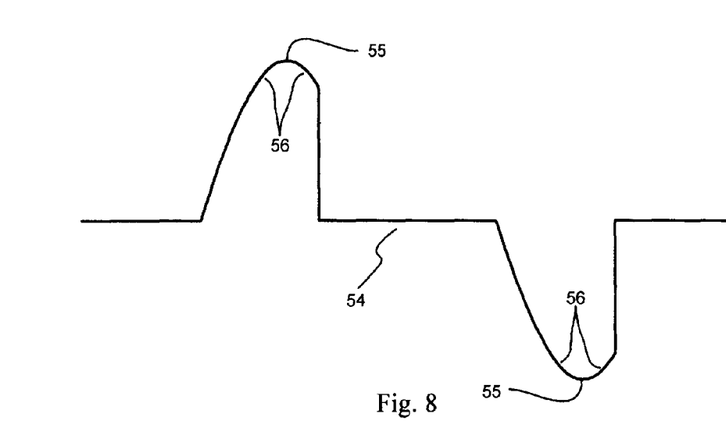
FIG. 8 shows coil current allowed to proceed beyond a peak for current cutoff.

As shown in FIG. 8, this produces definite regions where the slope of the current is zero at the peaks, 55 and allows sampling the received signal on both sides 56 of the zero slope for the purposes of ground balance and determining target phase response. This waveform will be further referred to as a "truncated half-sine." The truncated half-sine method and other circuit solutions are described in "Hybrid Induction Balance/Pulse Induction Metal Detector" (Earle), U.S. Ser. No. 61/398,298, now U.S. patent application Ser. No. 13/166,004.

Figure 9:
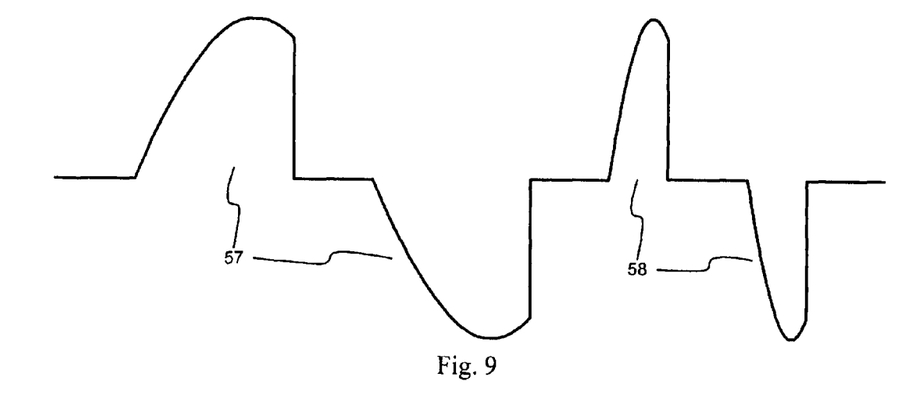
FIG. 9 shows bipolar truncated half-sine with two different widths and frequencies.

As mentioned before, some PI detectors utilize two or more transmit pulse widths to extract more information on ground and target signals. In continuous wave detectors, multiple sinusoidal frequencies are often used for the same purpose. The truncated half-sine can accomplish both methods simultaneously. FIG. 9 shows a (bipolar) truncated half-sine with two different pulse widths and resulting "frequencies." Pulses 57 have a relatively wide pulse width and low frequency, and pulses 58 have a relatively narrow pulse width and high frequency.

Figure 10:
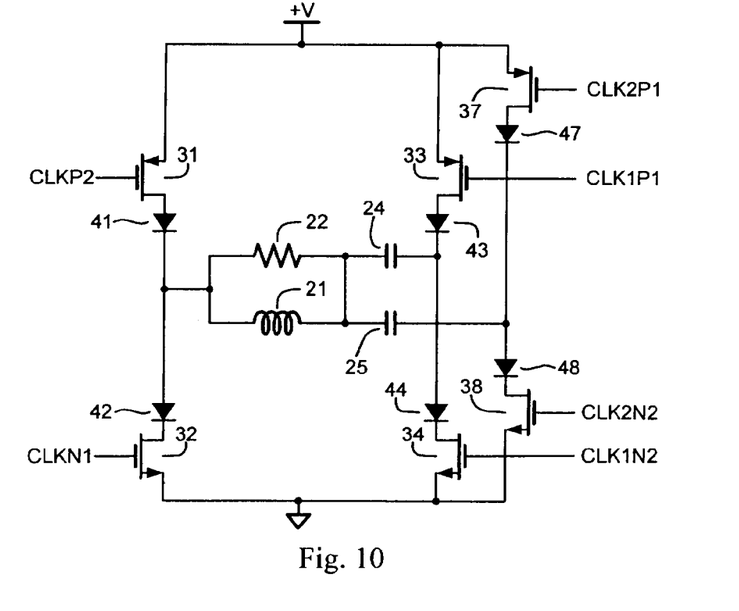
FIG. 10 shows a circuit to implement bipolar transmission with two different frequencies.

The multi-frequency truncated half-sine can be realized using an expanded version of the circuit in FIG. 6. FIG. 10 shows a circuit which can implement bipolar transmission with the equivalence of two different frequencies. Capacitor 24 sets the frequency of a first half-sine, with transistor 31, 32, 33, 34 providing the switching. Capacitor 25 sets the frequency of a second half-sine, with transistors 31, 32, 37, 38 providing the switching. Diodes 47 and 48 are added near switches 37 and 38. A relatively larger capacitor value of capacitor 24, coupled with a longer turn-on time, produces a lower frequency, while a smaller capacitor 25 and shorter turn-on time produces a higher frequency. Additional frequencies may be added in similar fashion.

This circuit does not quite produce the waveform in FIG. 9. As both the capacitance and the turn-on time decrease, the amplitude of the resulting truncated half-sine also decreases. The result is a loss of sensitivity for the higher frequency, which is often compensated for by running multiple cycles of short pulses per each single long pulse cycle. See U.S. Pat. No. 5,537,041.

Figure 11:
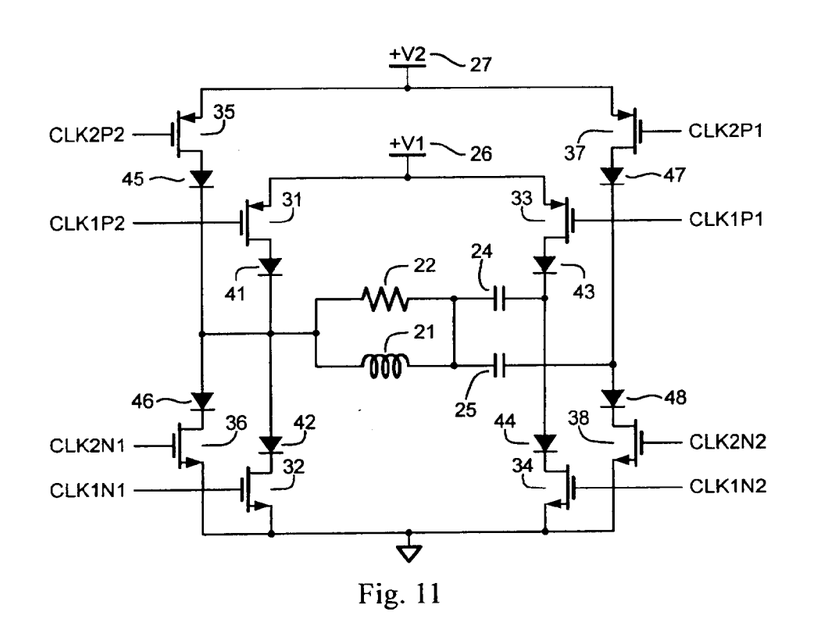
FIG. 11 shows a circuit with separate supply voltages for multiple frequencies.

This can better be remedied by using separate supply voltages for the multiple frequencies as shown in FIG. 11. A lower frequency may be implemented with a larger capacitor 24 driven from a lower voltage 26 using transistors 31, 32, 33, 34. A higher frequency may be implemented with a smaller capacitor 25 driven from a higher voltage 27 using transistors 35, 36, 37, 38. Transistors 32 and 36 and diodes 42 and 46 are redundant and may be combined. The result is the desired waveform in FIG. 9.

Figure 12:
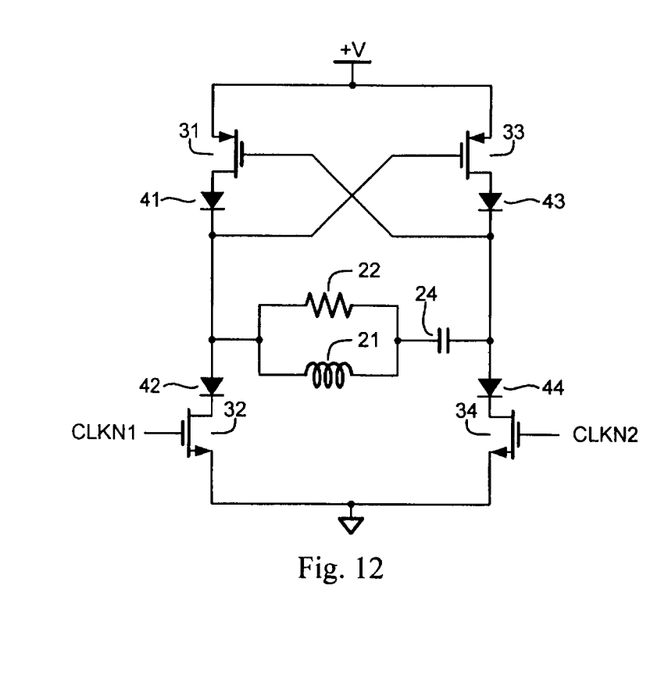
FIG. 12 shows a circuit similar to FIG. 6 with self-switching cross coupling.
Figure 13:
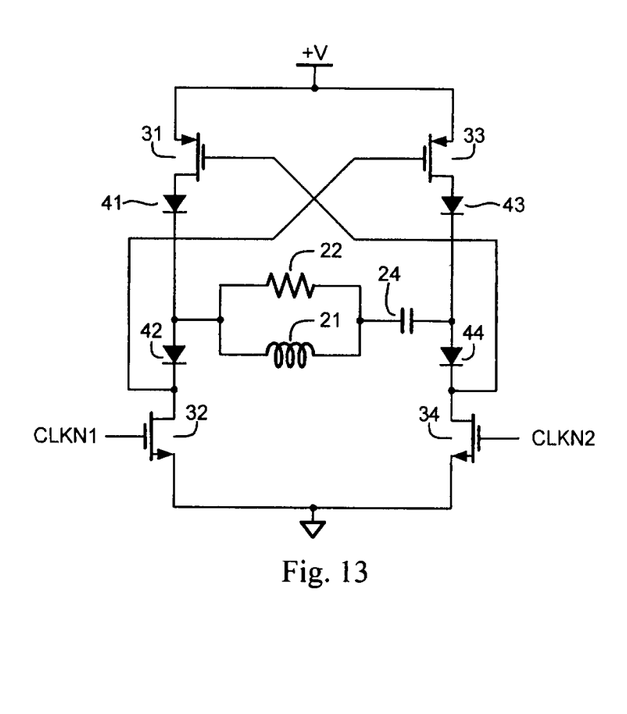
FIG. 13 shows cross coupled devices driven directly from NMOS devices.

All of the circuits described so far use both high-side (P-side) and low-side (N-side) switches driven from clock sources. Each switch may require its own unique clock signal even though some clock signals may have identical timing. This will often depend on drive voltage level needs. A simplification is to make some of the switches self-switching by connecting them in a cross-coupled manner. FIG. 12 shows the circuit in FIG. 6 having self-switching. In some configurations better switching performance is achieved when the cross-coupled devices are driven directly from the NMOS devices, as shown in FIG. 13. Multifrequency truncated half-sine drivers such as in FIG. 11 may be similarly simplified.

There are many variations of these concepts that will become apparent to anyone skilled in the art. In general, other switching devices such as bipolar transistors may be used in lieu of MOSFETs, and many of the flyback diodes may be eliminated. Most circuits have been shown as being powered from "+V" to ground, but a negative-referenced supply or bipolar supplies may be implemented. Unipolar current waveforms instead of bipolar may implemented. In FIG. 6 switches 33 and 34 may be eliminated, and capacitor 24 may be tied to a fixed voltage. In cross-coupled designs, cross-coupled N-side switches with clocked P-side switches may be implemented and, in fact, may be advantageous in some cases.

The truncated half-sine transmit waveform results in an equivalent CW portion during the coil turn-on time and a PI portion at the point of coil switch-off. In order to receive and process the signal from the CW portion an induction-balanced coil is required. If a mono coil is used, then the PI portion can still be processed, but the CW portion cannot. While the transmit waveforms shown thus far represent the current through the transmit coil, the receive waveforms will represent the voltage at the receive coil.

Figure 14:
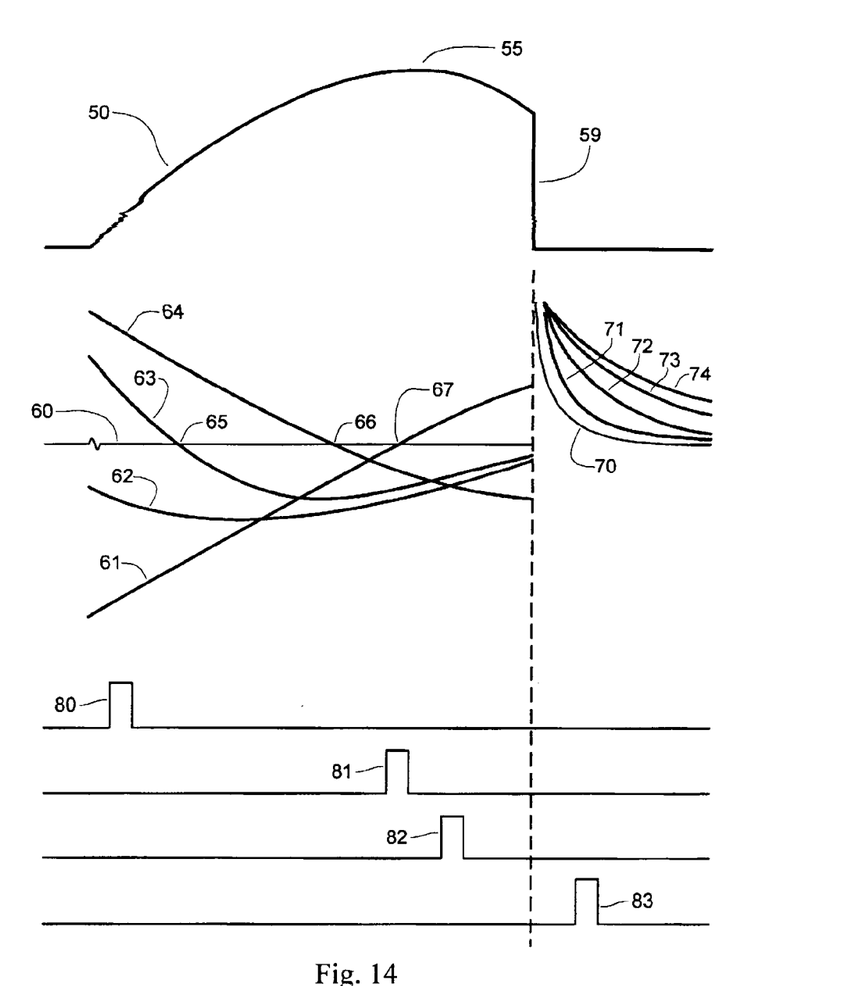
FIG. 14 shows typical waveform deflections from a single transmit pulse.

FIG. 14 shows typical received waveform deflections for a single transmit pulse 50. The nominal receive waveform 60 during the turn-on time 50 is depicted as flat but will depend on the induction balance characteristics of the coil assembly. Response waveforms 61, 62, 63, 64 are shown as typical deflections of the nominal waveform 60. Similarly, at turn-off 59 the nominal receive waveform 70 will have a certain transient response dependent on the characteristics of the coil assembly and response waveforms 71, 72, 73, 74 are shown as typical deflections of the nominal waveform 70.

During turn-on 50 both magnetic responses (ferrite and small iron) and eddy responses (nonferrous and large iron) produce deflections which exhibit pivoting about the nominal response 60.

This pivoting corresponds to phase shifts in traditional CW responses. Ferrite response 61 tilts counterclockwise about pivot point 67. Because ferrite is theoretically lossless and ideally exhibits no phase shift, this should occur at the peak 55 of the transmit current where di/dt is zero. This point is called the "ground pivot."

A US nickel response 63 exhibits a clockwise tilt at a much earlier pivot point 65, while a US silver dollar response 64 exhibits a clockwise tilt at a later pivot point 66. Magnetic iron response 62 can either be viewed as a clockwise tilt with a pivot point occurring sometime before the start of turn-on period 50, or as a counterclockwise tilt with a pivot point occurring sometime after the turn-off point 59. In either case, most ferrous targets produce a negative response across the turn-on time 50.

The target responses at the turn-off point 59 follow traditional PI responses. All targets and ground exhibit the same deflection polarity, with the ground response 71 having approximately a l/t response and conductive responses 72, 73, 74 having approximately an exponential response compared to the nominal response 70. In traditional ground balanced PI detectors a late sample is subtracted from an early sample in proper proportion to eliminate the ground response. The drawback is that all target responses are weakened at least a little, and a so-called "target hole" arises where a small range of target responses are completely or nearly eliminated.

It should be noted that the deflections described are valid for one polarity of the transmit waveform, and for a bipolar transmitter the opposite polarity transmit waveform will produce opposite deflections. It should also be noted that the polarities of the deflections depend on how the coils are wound and connected. It is therefore understood that all waveform descriptions are illustrative and not absolute.

Timing pulses 80, 81, 82, 83 represent the sample points of the receive waveform for the purpose of signal processing. There are many ways to accomplish this including various synchronous demodulation schemes and direct sampling, and these various methods are within the scope of this invention.

Timing pulse 83 is used to sample the response after the turn-off point 59 in a manner similar to traditional PI. This sample (herein called the "main" sample) produces responses of a consistent polarity for all conductors (e.g. US nickel 72, US silver dollar 73, and iron 74), and a relatively weaker response 71 for ground but also of the same polarity as conductors. The delay of pulse 83 relative to the turn-off point 59 is usually a few microseconds to 10's of microseconds, with a typical delay of 10 µs.

Timing pulse 82 is used to sample the turn-on response 50 after the ground pivot point 67. At this sample (herein called the "ground" sample) all conductive targets will have a negative polarity while ground will have a positive polarity. By properly scaling and subtracting the ground sample from the main sample it is possible to cancel the ground signal. At the same time, responses from all conductors will get stronger, which is opposite from traditional PI ground subtraction methods, and the "target hole" problem of traditional PI detectors is also eliminated. Any combination of sample delay, sample pulse width, or signal gain may be applied to either or both of the main sample or ground sample to effect ground signal cancellation. This may be manually controlled by the user or implemented as an automated system which tracks ground conditions. Timing pulse 80 is used to sample early in the turn-on response 50 and timing pulse 81 is used to sample at or very near the ground pivot point. These samples can be processed in a manner similar to CW as near-quadrature signal responses that produce amplitude and phase information. This phase information can then be used to determine the ground response by using techniques similar to those used in CW, and it is possible to effect an automated ground tracking method to compensate for ground variability by adjusting the scaling of the main and/or the ground signals. The phase can also be used to identify and discriminate conductive targets, also in a manner similar to those used in CW.

Multiple pulse widths (frequencies) can produce varied responses to targets. For example, a relatively long pulse width (low frequency) may produce a stronger response to high conductors,
and a relatively short pulse width (high frequency) may produce a stronger response to low conductors.

Multiple pulse widths can be processed using individual processing channels or may be combined into common processing channels if the half-sine response curves are substantially alike. When using separate processing channels the results from two or more frequencies can be used to subtract the responses from salt water, which is advantageous when using a metal detector in a saltwater location.

While the invention has been described with reference to specific embodiments, modifications and variations of the invention may be constructed without departing from the scope of the invention, which is defined in the following claims.

I claim:

1. A metal detector comprising:
    (a) one or more transmit coils for producing a cyclic transmitted magnetic field in response to a cyclic transmit current, wherein each transmit current cycle is comprised of one or more transmit current pulses, wherein one or more transmit current pulses exhibit approximately a half-sine waveform during turn-on which sinusoidally rises to a peak current, and which at or past the peak current is truncated by substantially shutting off the coil current, and which is followed by a turn-off time in which the applied transmit current is substantially zero;
    (b) transmit circuitry for generating the transmit current pulses applied to the one or more transmit coils comprising one or more switching networks for switching the one or more coils to appropriate drive circuitry comprised of a unipolar or bipolar power supply voltage and one or more series-connected resonant capacitors for the purpose of producing a substantially half-sine response during the turn-on time;
    (c) one or more receive coils for receiving a response signal created from the transmitted magnetic field and its effect on a surrounding matrix and conductive targets;
    (d) receive circuitry comprising a plurality of receive channels each comprised of sampling circuitry and processing circuitry, wherein a receive channel samples a received flyback response created by the truncation of the transmit current and herein called the flyback sample, and wherein a receive channel samples a received half-sine response after the peak of the transmit half-sine current but before the truncation point and herein called the ground sample, and wherein the flyback sample and the ground sample are combined and either or both samples are adjusted such that the combined response due to a ground matrix is substantially minimized.

2. The metal detector of claim 1, wherein the transmit current pulse is a truncated half-sine which is truncated substantially close to the peak of the half-sine current waveform.

3. The metal detector of claim 1, wherein the transmit current pulse is a truncated half-sine which is truncated after the peak of the half-sine current waveform.

4. The metal detector of claim 1, wherein a transmit current pulse is followed by a turn-off time in which the applied transmit current is substantially zero which is followed by a substantially identical transmit current pulse of opposite current polarity.

5. The metal detector of claim 1, wherein a plurality of transmit current pulses are comprised of truncated half-sine current pulses of different pulse width durations with the same characteristic sinusoidal resonance response.

6. The metal detector of claim 1, wherein a plurality of transmit current pulses are comprised of truncated half-sine current pulses of different pulse width durations, wherein each pulse width duration is effected by a switching network for switching the one or more coils to appropriate drive circuitry, including a series-connected resonance capacitor whose value is selected to produce a truncated half-sine current response in which each pulse width duration has substantially the same truncation current level relative to its peak current level.

7. The metal detector of claim 6, wherein the drive circuitry for each pulse width duration is powered by the same power supply voltage.

8. The metal detector of claim 6, wherein the drive circuitry for each pulse width duration is powered by a different power supply voltage, wherein the power supply voltage is scaled according to the pulse width duration and resonance capacitor selection such that each pulse width duration has substantially the same current amplitude.

9. The metal detector of claim 1, wherein the adjustment method is one or more of sample delay, sample width, or sample gain.

10. The metal detector of claim 9, wherein the adjustment method is under the manual control of the user.

11. The metal detector of claim 9, wherein the adjustment method is under the automated control of the metal detector.

12. The metal detector of claim 1, wherein a receive circuit samples a received half-sine response substantially at the peak of the transmit half-sine current and herein called the X sample, and wherein the X sample is processed to determined characteristics of the ground matrix and the results are used to automatically adjust the ground sample such that the combined response of the flyback sample and the ground sample due to the ground matrix is substantially minimized.

13. The metal detector of claim 1, wherein a receive circuit samples a received half-sine response shortly after the beginning of the transmit half-sine current turn-on point and herein called the R sample, and wherein a receive circuit samples a received half-sine response substantially at the peak of the transmit half-sine current and herein called the X sample, and wherein the X sample and the R sample are processed and compared to determined probable target type.

14. A metal detector comprising:
(a) one or more transmit coils for producing a cyclic transmitted magnetic field in response to a cyclic transmit current, wherein each transmit current cycle is comprised of one or more transmit current pulses, wherein one or more transmit current pulses exhibit approximately a half-sine waveform during turn-on which sinusoidally rises to a peak current, and which at or past the peak current is truncated by substantially shutting off the coil current, and which is followed by a turn-off time in which the applied transmit current is substantially zero;
(b) transmit circuitry for generating the transmit current pulses applied to the one or more transmit coils comprising one or more switching networks for switching the one or more coils to appropriate drive circuitry comprised of a unipolar or bipolar power supply voltage and one or more series-connected resonant capacitors for the purpose of producing a substantially half-sine response during the turn-on time;
(c) one or more receive coils for receiving a response signal created from the transmitted magnetic field and its effect on a surrounding matrix and conductive targets;
(d) receive circuitry comprising a plurality of receive channels each comprised of sampling circuitry and processing circuitry, wherein a receive channel samples a received flyback response created by the truncation of the transmit current and herein called the flyback sample, and wherein a receive channel samples a received half-sine response after the beginning of the transmit half-sine current turn-on point and herein called the R sample, and wherein the flyback sample is used to determine the presence of a conductive target and the R sample is used to determine probable target type.

15. The metal detector of claim 14, wherein the position of the R sample may be adjusted to change the response of certain target types for the purpose of accepting or rejecting certain target responses.

16. The metal detector of claim 14, wherein a plurality of pulse width durations are received and processed, and wherein the results are scaled and subtracted to substantially eliminate the response of saltwater.

17. A metal detector method comprising:
providing one or more transmit coils for producing a cyclic transmitted magnetic field in response to a cyclic transmit current, each transmit current cycle providing one or more transmit current pulses, wherein the one or more transmit current pulses exhibit approximately a half-sine waveform during turn-on which waveform sinusoidally rises to a peak current, and which at or past the peak current is truncated by substantially shutting off the coil current, and which is followed by a turn-off time in which the applied transmit current is substantially zero,
providing transmit circuitry for generating the transmit current pulses applied to the one or more transmit coils, providing one or more switching networks for switching the one or more coils to drive circuitry, providing the drive circuitry with a unipolar or bipolar power supply voltage and one or more series-connected resonant capacitors, and producing a substantially half-sine response during turn-on time,
providing one or more receive coils for receiving a response signal created from the transmitted magnetic field and its effect on a surrounding matrix and conductive targets,
providing receive circuitry having a plurality of receive channels of sampling circuitry and processing circuitry, wherein one receive channel samples a received flyback response created by the truncation of the transmit current which is a flyback sample, and wherein another receive channel samples a received half-sine response after the peak of the transmit half-sine current but before the truncation point which is a ground sample, and combining the flyback sample and the ground sample and adjusting either or both samples are adjusted such that the combined response due to a ground matrix is substantially minimized.

18. The metal detector method of claim 17, wherein each transmit current pulse provides a truncated half-sine which is truncated substantially close to the peak of the half-sine current waveform.

19. The metal detector method of claim 17, wherein the transmit current pulse provides a truncated half-sine which is truncated after the peak of the half-sine current waveform.

20. The metal detector method of claim 17, wherein each transmit current pulse is followed by a turn-off time in which the applied transmit current is substantially zero which is followed by a substantially identical transmit current pulse of opposite current polarity.

21. The metal detector method of claim 17, wherein the providing of a plurality of transmit current pulses comprises providing truncated half-sine current pulses of different pulse width durations with the same characteristic sinusoidal resonance response.

22. The metal detector method of claim 17, wherein the providing of a plurality of transmit current pulses comprises providing truncated half-sine current pulses of different pulse width durations, and effecting each pulse width duration by a switching network for switching the one or more coils to appropriate drive circuitry, including providing a series-connected resonance capacitor having a value for producing a truncated half-sine current responses in which each pulse width duration has substantially the same truncation current level relative to its peak current level.

23. The metal detector method of claim 22, wherein the drive circuitry for each pulse width duration is powered by the same power supply voltage.

24. The metal detector method of claim 22, wherein the drive circuitry for each pulse width duration is powered by a different power supply voltage, wherein the power supply voltage is scaled according to the pulse width duration and resonance capacitor selection such that each pulse width duration has substantially the same current amplitude.

25. The metal detector method of claim 17, wherein the adjusting is one or more of sample delay, sample width, or sample gain.

26. The metal detector method of claim 25, wherein the adjusting is manually controlled by the user or is automatically controlled by the metal detector.

27. The metal detector method of claim 17, wherein a receive circuit samples a received half-sine response substantially at the peak of the transmit half-sine current which is an X sample, and wherein the X sample is processed to determined characteristics of the ground matrix and the results are used to automatically adjust the ground sample such that the combined response of the flyback sample and the ground sample due to the ground matrix is substantially minimized.

28. The metal detector method of claim 17, wherein one receive circuit samples a received half-sine response shortly after the beginning of the transmit half-sine current turn-on point called the R sample, and another receive circuit samples a received half-sine response substantially at the peak of the transmit half-sine current called the X sample, and processing and comparing the X sample and the R sample to determine probable target type.

29. The metal detector method of claim 28, further comprising receiving and processing a plurality of pulse width durations, and wherein the results are scaled and subtracted to substantially eliminate the response of saltwater.

30. A metal detector method comprising:
providing one or more transmit coils for producing a cyclic transmitted magnetic field in response to a cyclic transmit current, each transmit current cycle providing one or more transmit current pulses, wherein the one or more transmit current pulses exhibit approximately a half-sine waveform during turn-on which waveform sinusoidally rises to a peak current, and which at or past the peak current is truncated by substantially shutting off the coil current, and which is followed by a turn-off time in which the applied transmit current is substantially zero, providing transmit circuitry for generating the transmit current pulses applied to the one or more transmit coils, providing one or more switching networks for switching the one or more coils to drive circuitry, providing the drive circuitry with a unipolar or bipolar power supply voltage and one or more series-connected resonant capacitors, and producing a substantially half-sine response during turn-on time, providing one or more receive coils for receiving a response signal created from the transmitted magnetic field and its effect on a surrounding matrix and conductive targets, providing receive circuitry having a plurality of receive channels of sampling circuitry and processing circuitry, wherein one receive channel samples a received flyback response created by the truncation of the transmit current called the flyback sample, and another receive channel samples a received half-sine response after the beginning of the transmit half-sine current turn-on point called the R sample, and using the flyback sample to determine the presence of a conductive target and using the R sample to determine probable target type.

31. The metal detector method of claim 30, wherein the positioning of the R sample is adjusted to change the response of certain target types for the purpose of accepting or rejecting certain target responses.

* * * * *